United States Patent
Widdows (10) Patent No.: US 11,907,275 B2
(45) Date of Patent: Feb. 20, 2024

(54) SYSTEMS AND METHODS FOR PROCESSING TEXT DATA FOR DISABBREVIATION OF TEXT UNITS

(71) Applicant: GRABTAXI HOLDINGS PTE. LTD., Singapore (SG)

(72) Inventor: Dominic Widdows, Seattle, WA (US)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 102 days.

(21) Appl. No.: 17/610,075

(22) PCT Filed: May 15, 2019

(86) PCT No.: PCT/SG2019/050266
§ 371 (c)(1),
(2) Date: Nov. 9, 2021

(87) PCT Pub. No.: WO2020/231323
PCT Pub. Date: Nov. 19, 2020

(65) Prior Publication Data
US 2022/0237217 A1     Jul. 28, 2022

(51) Int. Cl.
*G06F 16/00* (2019.01)
*G06F 16/33* (2019.01)
*G06F 16/35* (2019.01)

(52) U.S. Cl.
CPC .......... *G06F 16/3347* (2019.01); *G06F 16/35* (2019.01)

(58) Field of Classification Search
None
See application file for complete search history.

(56) References Cited

U.S. PATENT DOCUMENTS 8,930,813 B2 * 1/2015 McMaster ............. G06F 40/151
                                                     715/261
9,355,084 B2 * 5/2016 Doornenbal .......... G06F 40/169
(Continued)

FOREIGN PATENT DOCUMENTS

CN    104731771    6/2015
JP    2010-152561  7/2010
JP    2018-055491  4/2018

OTHER PUBLICATIONS

European Search Report for Application No. 19928628.7, dated Nov. 15, 2022 (11 pages).
(Continued)

*Primary Examiner* — Debbie M Le
(74) *Attorney, Agent, or Firm* — Buckley, Maschoff & Talwalkar LLC (57) ABSTRACT

A communications server apparatus (100) is configured to receive (202) text data comprising at least one text data element associated with an abbreviated text unit. The text data element is compared (204) with a plurality of candidate text data elements from a representation of a given text database, each candidate text data element associated with a respective candidate text unit in the database. Values for a similarity measure between the at least one text data element and the candidate text data elements are determined (206), and candidate text data elements are processed (208) to select candidate text data elements with associated candidate text units having an ordered relationship with the abbreviated text unit. The similarity measure values and the candidate text data element selections are used (210) to nominate an associated candidate text unit as a disabbreviated text unit for the abbreviated text unit.

14 Claims, 5 Drawing Sheets

(56) References Cited

U.S. PATENT DOCUMENTS

| | | | |
|---|---|---|---|
| 10,140,272 B2* | 11/2018 | Bao | G06F 40/295 |
| 10,303,746 B1* | 5/2019 | Periasamy | G06F 40/151 |
| 10,643,276 B1* | 5/2020 | Loddo | G06Q 40/03 |
| 11,010,535 B1* | 5/2021 | Periasamy | G06F 40/151 |
| 11,017,180 B2* | 5/2021 | Gandhi | G06F 40/284 |
| 11,138,382 B2* | 10/2021 | Podgorny | G06N 3/08 |
| 2007/0220037 A1 | 9/2007 | Srivastava et al. | |
| 2008/0059421 A1 | 3/2008 | Baartman et al. | |
| 2009/0248401 A1 | 10/2009 | Grabarnik et al. | |
| 2010/0145676 A1* | 6/2010 | Rogers | G06F 40/157 704/9 |
| 2012/0084076 A1 | 4/2012 | Boguraev et al. | |
| 2016/0041990 A1 | 2/2016 | Dabah et al. | |
| 2016/0098386 A1 | 4/2016 | Rangarajan Sridhar | |
| 2016/0103808 A1 | 4/2016 | Anders et al. | |
| 2016/0350652 A1 | 12/2016 | Min et al. | |
| 2017/0091164 A1 | 3/2017 | Bao et al. | |
| 2017/0193091 A1 | 7/2017 | Byron et al. | |
| 2018/0089172 A1 | 3/2018 | Needham | |

OTHER PUBLICATIONS

Glass, et al. "Language Independent Acquisition of Abbreviations", Arxiv. Org, Cornell University Library, 201 Olin Library Cornell University Ithaca, NY 14853, Sep. 23, 2017, (9 pages).

Charbonnier, et al., "Using Word Embeddings for Unsupervised Acronym Disambiguation", Proceedings of the 27th International Conference on Computational Linguistics, Aug. 20, 2018, pp. 2610-2619.

Written Opinion for PCT/SG2019/050266, dated Aug. 23, 2019, 5 pages.

Damdoo, et al., "Probabilistic Language Model for Template Messaging Based on Bi-Gram", Conference: IEEE-International Conference on Advances in Engineering, Science and Management, Conference Date: Mar. 30-31, 2012, 3 pages.

Jose, et al. "Lexico-Syntactic Normalization Model for Noisy SMS Text", Conference: 2014 International Conference on Electronics, Communication and Computational Engineering (ICECCE), Conference Date; Nov. 17-18, 2014, 3 pages.

International Search Report for PCT/SG2019/050266, dated Aug. 23, 2019, 4 pages.

De Vries, "Indonesian Abbreviations and Acronyms", In Bijdragen tot de Taal-, Land-en Volkenkunde 126, (1970), No. 3, Leiden, pp. 338-346, 10 pages.

Fodden, " IBM Granted Patent for . . . Dict.?", Website: Slaw, Canada's online Legal Magazine Publication, Date: Dec. 31, 2009, 2 pages.

Hidayatullah, et al., "Pre-processing Tasks in Indonesian Twitter Messages", International Conference on Computing and Applied Informatics 2016, IOP Conf. Series: Journal of Physics: Conf. Series 801 (2017), 012072, pp. 1-6, 7 pages.

"Bahasa Indonesia SMS Abbreviations Explained", Bahasa Indonesia SMS Abbreviations Explained—Bail Manual, Apr. 24, 2018, pp. 1-8, 8 pages.

Japanese Notice of Reasons for Refusal for Application No. 2021-568104, dated Feb. 28, 2023 (19 pages).

Sekiguchi, Yuichiro, "Clipped Word Extraction using Blog Documents," DBSJ Letters vol. 6, No. 2, Sep. 2007, pp. 21-24.

* cited by examiner

SYSTEMS AND METHODS FOR PROCESSING TEXT DATA FOR DISABBREVIATION OF TEXT UNITS

TECHNICAL FIELD

The invention relates generally to the field of communications. One aspect of the invention relates to a communications server apparatus for processing text data for disabbreviation of text units. Another aspect of the invention relates to a communications device, and a system, for processing text data for disabbreviation of text units. Other aspects of the invention relate to a method for processing text data for disabbreviation of text units and computer programs and computer program products comprising instructions for implementing the method.

BACKGROUND

Data processing in communications systems is well known to the art. One example of data processing used in communications systems is processing of the data and information which facilitate text-based communications, as opposed to audio-based communications. Previously considered techniques have addressed processing text data in order for communications systems to work as efficiently as possible, and to reduce bandwidth use and computational processing.

Some such techniques address text units (such as words) in text-based communications, by processing data elements of the text data. Certain previously considered text data processing techniques have for example attempted to determine whether text units appearing in text-based communications are canonical to a text corpus, database or dictionary. Others have addressed determining whether non-canonical text units can be converted into canonical forms.

However, such previously considered methods have typically used rudimentary techniques for comparing data for non-canonical and canonical text units, or have provided highly complex techniques which nevertheless are susceptible to false positives and negatives. Such methods have had particular difficulty with abbreviated text units, such as abbreviations of common words typically found in text-based communications.

SUMMARY

Aspects of the invention are as set out in the independent claims. Some optional features are defined in the dependent claims.

Implementation of the techniques disclosed herein may provide significant technical advantages. For example, far greater accuracy can be achieved in decoding or determining a correct or canonical text unit or word for an abbreviated text unit in text data from a text-based communication.

In at least some implementations, the techniques disclosed herein allow for decoding or disabbreviating text units which would otherwise be indecipherable, or at least too difficult for previously considered techniques to address, without an unacceptable level of false positives/negatives. Moreover, these techniques allow for the greater accuracy and efficiency of any following data processing, such as textual analysis for facilitating features of a user interface or other feature of a communications device, compression or packetisation of communications, translation of text, and the like.

In an exemplary implementation, the functionality of the techniques disclosed herein may be implemented in software running on a handheld communications device, such as a mobile phone. The software which implements the functionality of the techniques disclosed herein may be contained in an "app"—a computer program, or computer program product—which the user has downloaded from an online store. When running on the, for example, user's mobile telephone, the hardware features of the mobile telephone may be used to implement the functionality described below, such as using the mobile telephone's transceiver components to establish the secure communications channel for receiving text-based communications, and using the mobile telephone's processor(s) to determine candidate text for abbreviated text units in the text data.

BRIEF DESCRIPTION OF THE DRAWINGS

The invention will now be described, by way of example only, and with reference to the accompanying drawings in which.

DETAILED DESCRIPTION

Figure 1:
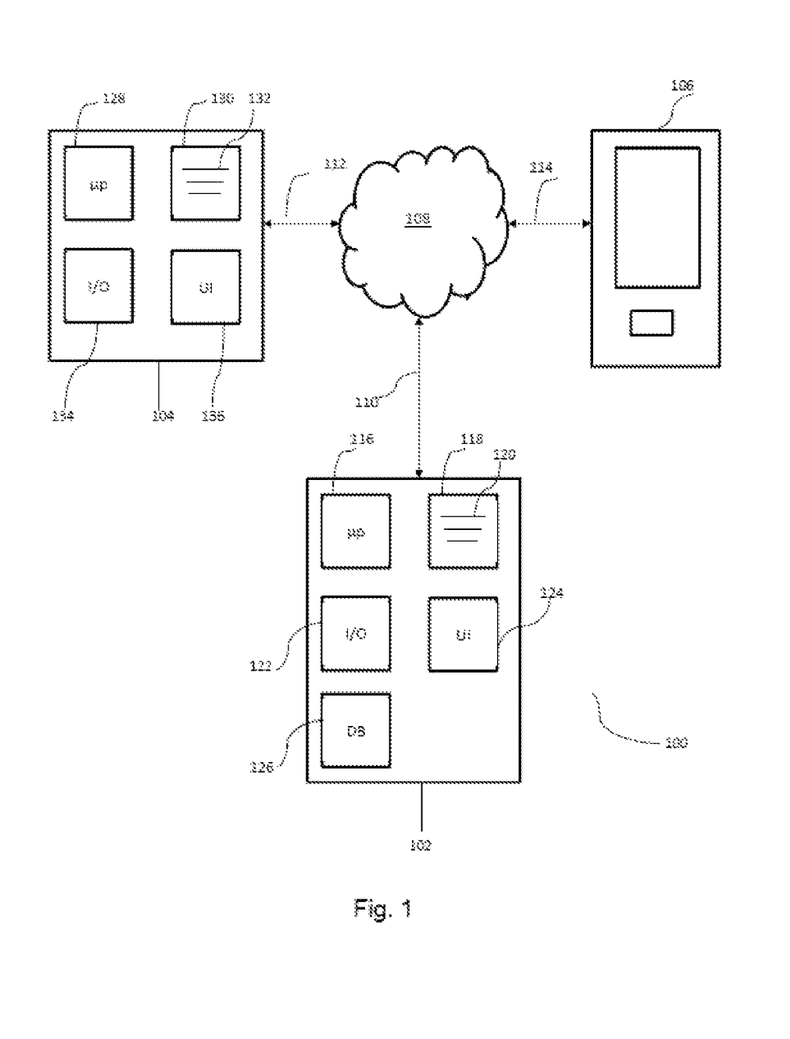
FIG. 1 is a schematic block diagram illustrating a first exemplary communications system for processing text data for disabbreviation of text units.

Referring first to FIG. 1, a communications system 100 is illustrated. Communications system 100 comprises communications server apparatus 102, service provider communications device 104 and user communications device 106. These devices are connected in the communications network 108 (for example the Internet) through respective communications links 110, 112, 114 implementing, for example, internet communications protocols. Communications devices 104, 106 may be able to communicate through other communications networks, such as public switched telephone networks (PSTN networks), including mobile cellular communications networks, but these are omitted from FIG. 1 for the sake of clarity.

Communications server apparatus 102 may be a single server as illustrated schematically in FIG. 1, or have the functionality performed by the server apparatus 102 distributed across multiple server components. In the example of FIG. 1, communications server apparatus 102 may comprise a number of individual components including, but not limited to, one or more microprocessors 116, a memory 118 (e.g. a volatile memory such as a RAM) for the loading of executable instructions 120, the executable instructions defining the functionality the server apparatus 102 carries out under control of the processor 116. Communications server apparatus 102 also comprises an input/output module 122 allowing the server to communicate over the communications network 108. User interface 124 is provided for user control and may comprise, for example, conventional computing peripheral devices such as display monitors, computer keyboards and the like. Server apparatus 102 also comprises a database 126, the purpose of which will become readily apparent from the following discussion.

Service provider communications device 104 may comprise a number of individual components including, but not limited to, one or more microprocessors 128, a memory 130 (e.g. a volatile memory such as a RAM) for the loading of executable instructions 132, the executable instructions defining the functionality the service provider communications device 104 carries out under control of the processor 128. Service provider communications device 104 also comprises an input/output module 134 allowing the service provider communications device 104 to communicate over the communications network 108. User interface 136 is provided for user control. If the service provider communications device 104 is, say, a smart phone or tablet device, the user interface 136 will have a touch panel display as is prevalent in many smart phone and other handheld devices. Alternatively, if the service provider communications device is, say, a conventional desktop or laptop computer, the user interface may have, for example, conventional computing peripheral devices such as display monitors, computer keyboards and the like. The service provider communications device may, for example, be a device managed by a text data processing service provider.

User communications device 106 may be, for example, a smart phone or tablet device with the same or a similar hardware architecture to that of service provider communications device 104.

Figure 2:
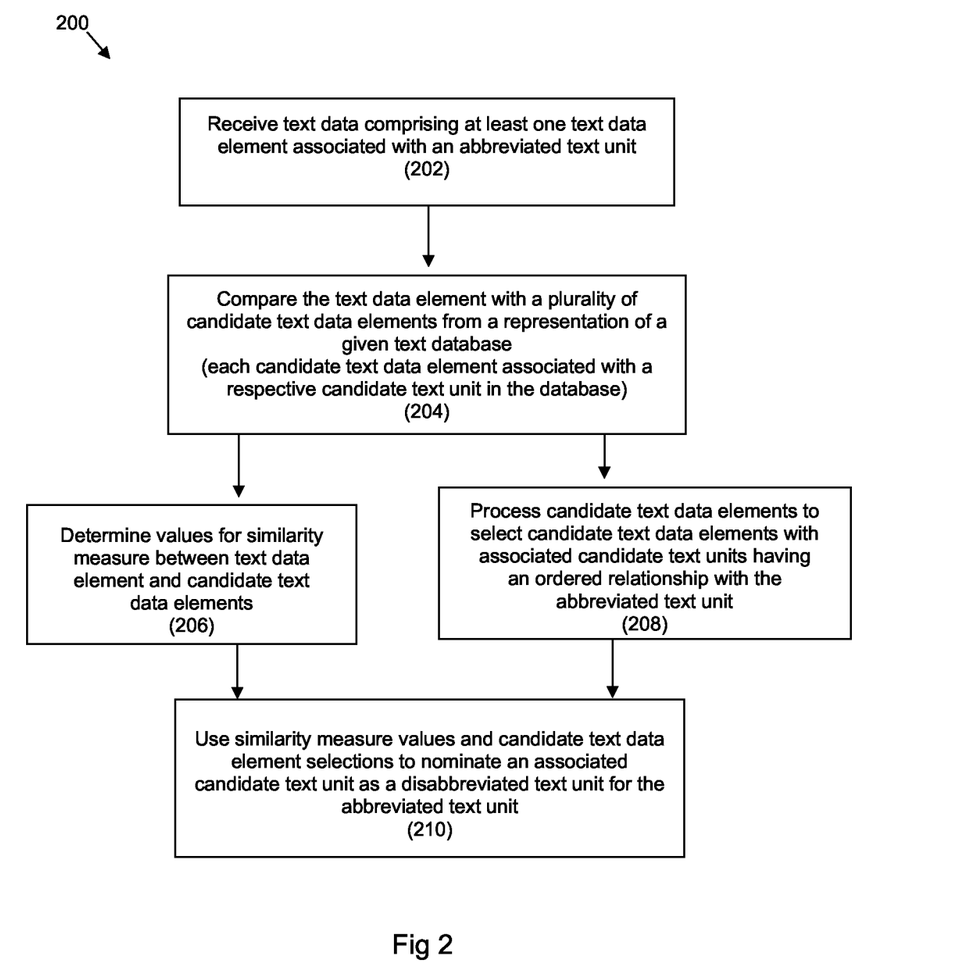
FIG. 2 is a flow chart illustrating steps of an exemplary method for processing text data.

FIG. 2 is a flow diagram illustrating a method for processing text data for disabbreviation of text units. FIGS. 1 and 2 and the foregoing description illustrate and describe a communications server apparatus 102 for processing text data for disabbreviation of text units, comprising a processor 116 and a memory 120, the communications server apparatus 102 being configured, under control of the processor 116, to execute instructions 120 stored in the memory 118 to: receive (202) text data comprising at least one text data element associated with an abbreviated text unit; compare (204) the at least one text data element with a plurality of candidate text data elements from a representation of a given text database, each candidate text data element associated with a respective candidate text unit in the database; determine (206) values for a similarity measure between the at least one text data element and the candidate text data elements; process (208) candidate text data elements to select candidate text data elements with associated candidate text units having an ordered relationship with the abbreviated text unit; and use (210) the similarity measure values and the candidate text data element selections to nominate an associated candidate text unit as a disabbreviated text unit for the abbreviated text unit.

Further, there is also provided a method, performed in a communications server apparatus 102 processing text data for disabbreviation of text units, the method comprising, under control of a processor 116 of the server apparatus: receiving (202) text data comprising at least one text data element associated with an abbreviated text unit; comparing (204) the at least one text data element with a plurality of candidate text data elements from a representation of a given text database, each candidate text data element associated with a respective candidate text unit in the database; determining (206) values for a similarity measure between the at least one text data element and the candidate text data elements; processing (208) candidate text data elements to select candidate text data elements with associated candidate text units having an ordered relationship with the abbreviated text unit; and using (210) the similarity measure values and the candidate text data element selections to nominate an associated candidate text unit as a disabbreviated text unit for the abbreviated text unit.

Yet further, there is also provided a communications system processing text data for disabbreviation of text units, comprising communications server apparatus (102), at least one user communications device (106) and communications network equipment (104, 108) operable for the communications server apparatus and the at least one user communications device to establish communication with each other therethrough, wherein the at least one user communications device (104, 106) comprises a first processor and a first memory, the at least one user communications device being configured, under control of the first processor, to execute first instructions stored in the first memory to: receive text data comprising at least one text data element associated with an abbreviated text unit, and wherein the communications server apparatus (102) comprises a second processor and a second memory, the communications server apparatus being configured, under control of the second processor, to execute second instructions stored in the second memory to: compare (204) the at least one text data element with a plurality of candidate text data elements from a representation of a given text database, each candidate text data element associated with a respective candidate text unit in the database; determine (206) values for a similarity measure between the at least one text data element and the candidate text data elements; process (208) candidate text data elements to select candidate text data elements with associated candidate text units having an ordered relationship with the abbreviated text unit; and use (210) the similarity measure values and the candidate text data element selections to nominate an associated candidate text unit as a disabbreviated text unit for the abbreviated text unit.

As noted above, techniques described herein relate to processing text data to decode or disabbreviate text units, such as words, found in a text-based communication or message, which have been abbreviated. The disabbreviation allows for example the units or words to be interpretable by a further processing step, such as text analysis or translation, or to be displayable in the interpreted, non-abbreviated form to a user of a communications device receiving the communication or message, for example via a display device of the communications device.

Instances of abbreviation of words or text units in communications messages are found in a variety of settings and media, but are particularly used in text-based communications, such as email, text or SMS messages, messages via social media platforms and the like, between users of computers and electronic devices. For instance, when typing short messages on handheld electronic devices which are to be transmitted to a recipient, users often type a simplified version of a word or phrase when they assume that the meaning of the word/phrase will be clear to the recipient in the simplified form. For example:

Officially recognized acronyms (e.g. UN=United Nations, USA=United States of America).

Slang terms that are not officially recognized but are heavily conventionalized (e.g. 'lol' meaning 'laugh out loud'; 'how r u' meaning 'how are you?').

Ad hoc shortenings, where the writer might not assume that the reader has seen this exact shortened form but assumes that the reader will reconstruct the original meaning correctly anyway ('thks', 'thx', 'thnks' are all recognizably versions of 'thanks').

Ad hoc shortenings are especially prevalent in some languages. Typical patterns include leaving out some characters, such as vowels: for example other forms of 'thanks' as noted above; in Indonesian 'sy sdh smp' meaning 'saya sudah sampai' (I already arrived). Other patterns may include, in languages which use them, omitting diacritical marks: in Vietnamese, '5 phut' meaning 'five phút' (five minutes).

Techniques described herein are directed to processing the text data and/or the data representing or underlying the text units (words, syllables, morphemes, and the like) in such messages, in order for example to convert abbreviated forms of words into their unabbreviated forms, thereby mapping abbreviated or non-canonical input text to the proper canonical form.

As noted above, the techniques described herein provide technical advantages in the data processing and communications realms, such as increasing efficiency and providing greater accuracy for follow-on text data processing applications. They also of course allow for easier interpretation of messages by users. Other potential applications for these techniques are:

- To support automatic translation of text conversations where the parties speak different languages. This can be used for example in pre-processing of input text in a ride-hailing application between a rider and a driver who are using different languages, prior to passing the correct canonical form of the input text to a translation service such as Google Translate, for the results of the translation to be transmitted/sent to the recipient.
- Auto-correct in a handheld electronic device to display the correct canonical form of the input text. The input text need not be for onward transmission to a recipient. For instance, it could be for personal note taking.

One broad form example technique aims to use a combination of two or more of:

a. comparing the abbreviated word or text unit with similar words, such as those which may be found in a similar context and/or those which are lexically or orthographically similar;

b. finding potential candidates for the correct canonical word by similar or matching ordering of the abbreviated word; and c. comparing the abbreviated unit with reference data derived from a body of reference work, finding frequently used words in the reference as candidates For example, in its simplest form step c. can be completed on the basis of selecting the candidate word/phrase which is the most frequently found in the body of reference work: e.g. the word/phrase which has the highest number of instances in Wikipedia.

For step a. one option is to train a heuristic model on a text database, and to compare the abbreviated input text unit to the text database by comparing it to the modelled data. For example, in a vector space model of a text database (as described in more detail below), a vector found for the input text unit can be compared to neighbouring vectors for canonical words in the modelled database, and a score derived for each candidate word/phrase. The most likely canonical form of the input text may be the word/phrase with the highest score.

One example of a similarity measure for step a. above is as follows.

Suppose character replacement for a text unit (in this case a word) W gives the candidate targets {W1, W2, . . . Wn}. That is, all of the Wi can be converted into W by removing characters (we can for instance stipulate that the removed characters are vowels) or diacritics. A comparison of the Wi to W can return direct matches. Then a similarity score sim(A, B) can be used to select which of the Wi is most similar to the source word W. That is, for each of the Wi, we calculate sim(W, Wi) and select the Wi with the largest similarity score.

In one technique, a number of similar candidates may be selected, for further processing (such as steps b. and/or c.). For example, candidates may be classified or ranked by similarity score, and processed in a ranked order, or only those above a given similarity score threshold processed.

It should be noted that there are many such text similarity measures known to the art. Some work by comparing how similar the distributions of words are in a given text corpus or database.

One way to do this is to construct a vector space model of a text corpus. As is well known to the art this can be done by representing the text corpus in a multi-dimensional space, with each word or text unit having a separate dimension, and a count made of the frequency of each word in the corpus to give the vector value. For any input text unit, the corresponding vector can be found in the vector space, and then a measure of the similarity of that vector to neighbouring vectors can be computed. For instance, a cosine similarity can be calculated—a representation of the angle between two vectors in the vector space.

Thus a word which in a given corpus is often found with another word (such as an abbreviation of that word, removing letters or diacritical marks) will have a high value for cosine similarity in the vector space model having the corresponding vectors for the two words.

Another similarity measure can compute a simple orthographical or lexical similarity between text units; for example, are the text units similar length, do they have the same number of vowels, consonants, and the like.

Figure 3:
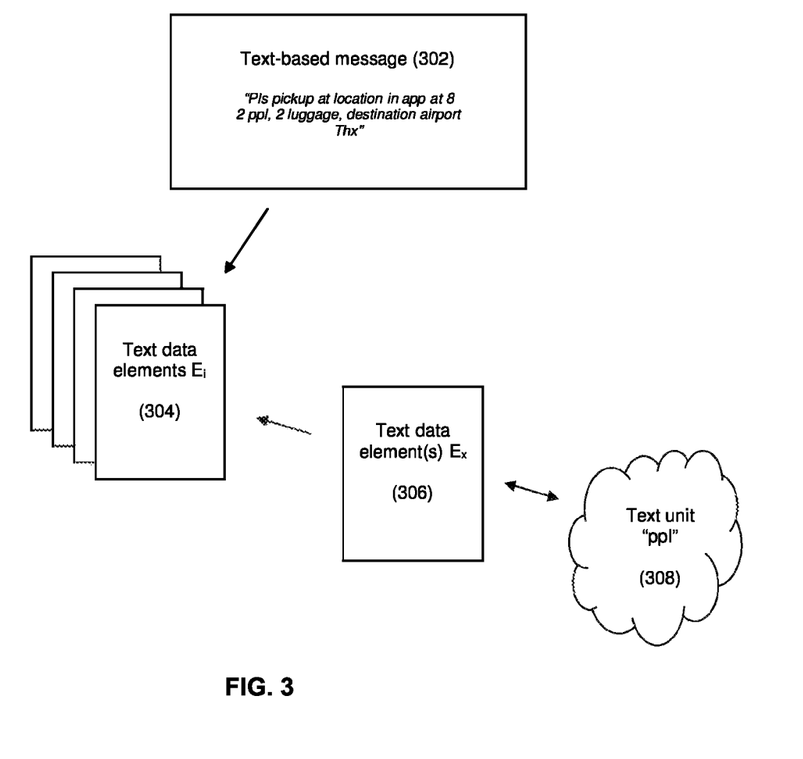
FIG. 3 is a schematic diagram illustrating processing of text data elements and their associated text units.

FIG. 3 is a schematic diagram illustrating text data elements and their associated text units. A text-based message 302 contains a text string "Pls pickup . . . ". To find disabbreviations for the text units or words in this text-based message, the message text (for example, as displayed on a user's device GUI) can be converted into text data elements Ei (304). This may be for example a conversion of each of the text units into representative vectors in a vector space model. The data elements could also be representations of the text units as lexical bases, for an orthographic comparison. Encoding of the text units into packetized data for transmission may also provide suitable text data elements for comparison. A data element associated with a given text unit may of course comprise more than one of the above; for example, the underlying text data element(s) processed for a given text unit may comprise both a representative vector and data representing the text unit in a compression, coding, transmission, or other software element format.

Of the data elements Ei, there is a text data element or element(s) Ex (306) which is associated with the text unit "ppl" (308) from the message ("2 ppl, 2 luggage . . . "). Thus the data element(s) Ei can be used in the text data processing, in order to find a disabbreviation for the text unit "ppl". In one example, the processing step will involve finding the vector associated with "ppl" in the vector space model trained on the corpus text, and finding neighbours by cosine similarity for that vector.

For a technique in an example of step c. above, a frequency of occurrence of candidate text units in a text database is determined and used for nominating an associated candidate text unit. For example, a Wikipedia corpus may be used, and the frequency of the input text unit in that corpus can be used to help determine which of a number of candidates (for example, those suggested by cosine similarity of neighbouring vectors for the vector associated with the input text unit) is the best choice.

For the vector space model, it can be advantageous to train or generate the model from a corpus which is relevant to the text inputs which are likely to require disabbreviation. For example, a Wikipedia corpus will contain few abbreviations such as 'thx'; however if the corpus is application specific, for example using a corpus of text-based messages as the training data, where it is text-based messages that will be interpreted, this is likely to have a similar population of abbreviations. Moreover, if the corpus is relevant—for example, if a set of driver messages is used to train a vector space model for later analysing driver messages—results should be improved still further.

However, for frequency of occurrence techniques, the preferred corpus may be a standardised set, so that canonical words are more likely to be present in the relevant context. Therefore in one technique, the text database for the determination of the frequency of occurrence of the associated candidate text unit is a different text database from that for the vector space model. This has the other advantage that such a standardized corpus may be publicly available.

In a technique for step b. above, a candidate text unit for disabbreviation may be selected if it has an ordered relationship with the abbreviated text unit; for example if characters of the abbreviated text unit are a partially ordered set of (or for) the characters of the candidate text unit, or characters of the abbreviated text unit are in a similar order to characters of the candidate text unit, or consonants of the abbreviated text unit are the same or similar to consonants of the candidate text unit, or in the same or similar order.

One difference between these techniques and previous techniques is that most similarity measures are symmetric, i.e., sim(a, b)=sim(b, a). This property is typically undesirable for text normalization, because (for example) we always want to map "dmn" to "dimana", but we never want to map "dimana" to "dmn". So we want sim("dmn", "dimana") to be high, but sim("dimana", "dmn") to be low. This can be implemented by only considering pairs where adding vowels back in maps the source to the target. This can be implemented as a filter. So for example, "dimana" can be converted to "dmn" just by removing letters, in this case vowels, so "dimana" is considered a potential replacement for "dmn". The converse does not hold, so "dmn" cannot be considered a potential replacement for "dimana".

This combination of similarity measures, of filtering by ordering relationship, and optionally discriminating by frequency in a (different) corpus provides accurate results even when the reduced form of the input word is many characters distant from the target word. Previously considered techniques have found these circumstances difficult; for those that just use vector neighbors, some words would come higher than the correct form; consonant filtering and corpus frequency weighting can corroborate the correct word. Mere orthographic distance may be high for some candidates which are actually correct disabbreviations. Techniques describe herein can allow dissimilar words to be selected as candidates, if they also pass the ordering and frequency comparison stages.

Figure 4:
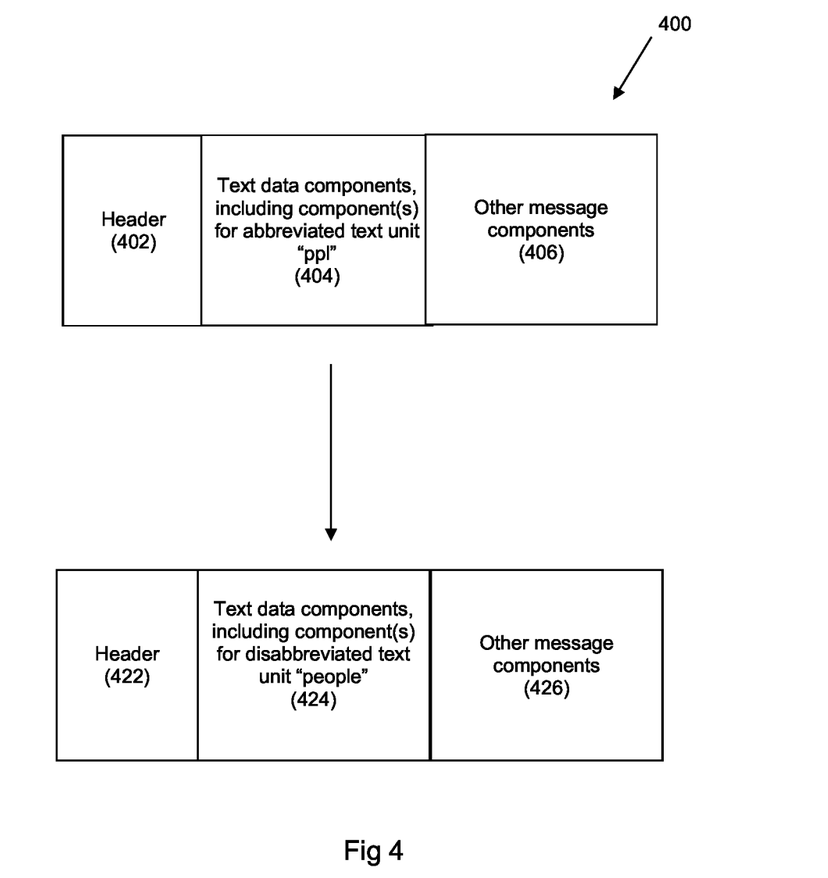
FIG. 4 is a schematic diagram illustrating examples of text data records and processing of those records.

FIG. 4 is a schematic diagram illustrating examples of text data records 400 and processing of those records. One text data record or packet has a header 402 and auxiliary message components 406. The record contains a number of text data components, which may include text data, text data elements, compressed text data or the like. Here, the text data component(s) for the abbreviated text unit "ppl" in the text message from FIG. 3 is (are) present. This record or packet may be received by the user communications device, communications apparatus or service provider communications device.

The payload data components of the data record can be processed in the manner described herein in order to find a disabbreviation for "ppl", and the payload edited or a new data record (422, 426) formed to now include (424) the data components for the disabbreviated text unit "people".

Figure 5:
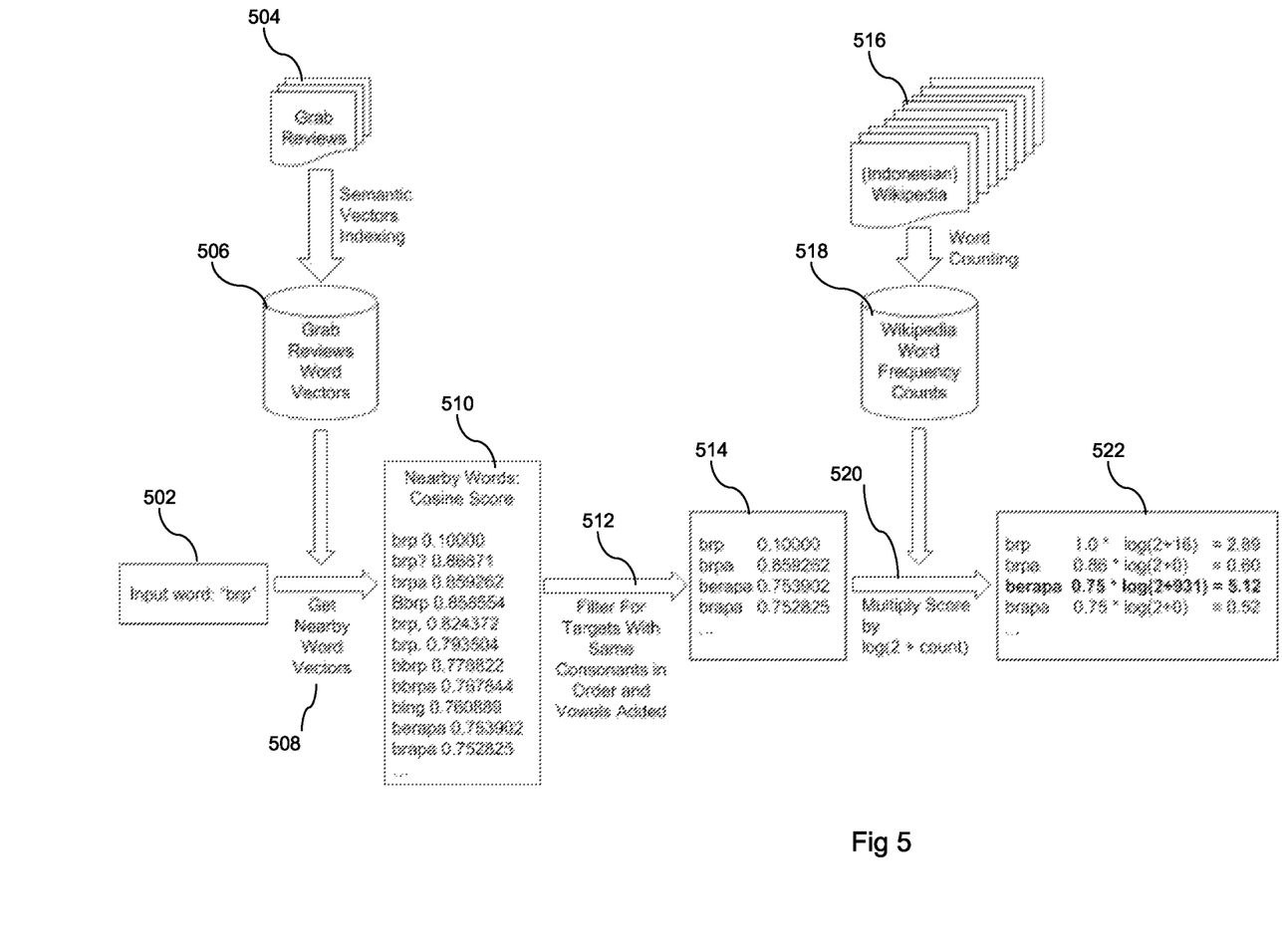
FIG. 5 is a flow chart illustrating steps of an exemplary method for processing text data.

FIG. 5 is a flow chart illustrating steps of an exemplary method for processing text data. In an exemplary technique, the disabbreviation word to be found is "berapa", Indonesian for 'how much/many', and the input abbreviation is 'brp'—a commonly used abbreviation in text-based messages. The text-based messages being analysed in this example are messages between drivers and passengers in a travel environment.

The input word 'brp' is received (502). The first stage is the vector space model or word-embedding similarity step. Here the corpus to be used to train or generate the vector space model is a set of reviews for a travel company, named "Grab". The reviews are likely to be written in a similar vernacular to the messages being received for disabbreviation.

Words in Grab reviews 504 (the word corpus of users reviewing their journeys, the drivers, so on) are pre-mapped to n-dimensional vectors 506. This is done as a pre-processing stage (as is the word counting for the Wikipedia comparison in 516, 518—see below).

In an alternative the vector model can be trained on a combination of the Grab reviews, and the Wikipedia corpus—this gives a combination of the vernacular expected in the messages, but also the range of the Wikipedia corpus in case some words in either corpus are missing.

Nearest neighbours are identified (508) from the vector model. Scoring is done by a cosine similarity calculation. The following stage (510) listing the candidates can then set a cut off threshold to give, say, the 10 closest hits. This gives a list of the closest neighbours and their respective similarity scores (similarity to the input text).

At this stage optionally an orthographic similarity score can also be calculated, and either used in parallel, or a combined score with the cosine similarity used. The use of orthographic similarity can enable shortenings of words to be compared with the corresponding words in Wikipedia and Grab reviews, even if they don't appear in the Grab reviews. The use of orthographic similarity at this stage may improve the effectiveness of the overall processing technique by reducing the complexity of the following filter stage 512, for example by reducing the number of candidates for filtering.

These results from the similarity score(s) are then filtered by ordering relationship, for example here to select only those which can be derived from the input text by adding something (e.g characters—consonants, vowels) or diacritical marks (diacritics). In this example (512) the filter is for targets with the same consonants in the same order, with one or more vowels added. The results (514) are therefore reduced again.

Next, the Indonesian Wikipedia corpus (516) having been used to find word frequency counts (518), the similarity score is multiplied by some function of the count from Wikipedia. In this example (520) the similarity score for each word pair (input word, each of the closest neighbours) is multiplied by the logarithm of the number of times this word appears in the Wikipedia corpus. The log (2+count) is used for a number of reasons: a word which appears 10 times more than another word is obviously significant, but not necessarily 10 times more significant; the add delta constant allows for useless results for zero instances—log (0) is considered to be not defined, and the steepness of the log curve is useful for low input numbers: log (1) is zero, so that everything will start from at least 2. A word from Grab reviews might have zero instances in the Wikipedia corpus, so 2 is added to it before taking the log. In alternatives, other types of weightings can also be done, e.g. using a square root, or another monotonically increasing function with positive y intercept.

The highest scoring result (522) from this final stage is taken as the most likely canonical form, and therefore as the nominated candidate text.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. Communications server apparatus for processing text data for disabbreviation of text units, comprising a processor and a memory, the communications server apparatus being configured, under control of the processor, to execute instructions stored in the memory, to:
    receive text data comprising at least one text data element associated with an abbreviated text unit;
    compare the at least one text data element with a plurality of candidate text data elements from a representation of a given text database, each candidate text data element associated with a respective candidate text unit in the database;
    determine values for a similarity measure between the at least one text data element and the candidate text data elements;
    process candidate text data elements to select candidate text data elements with associated candidate text units having an ordered relationship with the abbreviated text unit; and
    use the similarity measure values and the candidate text data element selections to nominate an associated candidate text unit as a disabbreviated text unit for the abbreviated text unit, wherein the representation of the text database is a vector space model trained on the given text database, and wherein the text data elements comprise vectors from the model, each vector of the vector space model being associated with a respective candidate text unit,
    and wherein the apparatus is configured to compare at least one text data element vector with a plurality of candidate text data element vectors.

2. The communications server apparatus as claimed in claim 1, wherein the apparatus is configured to, following determining values for the similarity measure:
    classify candidate text data elements based on the similarity measure values, and process classified candidate text data elements to select the candidate text data elements with associated candidate text units having an ordered relationship with the abbreviated text unit.

3. The communications server apparatus as claimed in claim 2, wherein the apparatus is configured to classify the candidate text data elements using a threshold minimum similarity measure value.

4. The communications server apparatus as claimed claim 1, wherein the apparatus is configured to:
    determine a frequency of occurrence of an associated candidate text unit in a text database; and use the determined frequency of occurrence for the step of nominating an associated candidate text unit.

5. The communications server apparatus as claimed in claim 4, wherein the text database for the determination of the frequency of occurrence of the associated candidate text unit is a secondary text database.

6. The communications server apparatus as claimed in claim 1, wherein for the step of selecting candidate text data elements with associated candidate text units having an ordered relationship with the abbreviated text unit, the apparatus is configured to:
    determine for a candidate text unit and an abbreviated text unit whether characters of the abbreviated text unit are a partially ordered set of or for the characters of the candidate text unit.

7. The communications server apparatus as claimed in claim 1, wherein for the step of selecting candidate text data elements with associated candidate text units having an ordered relationship with the abbreviated text unit, the apparatus is configured to:
    determine for a candidate text unit and an abbreviated text unit whether characters of the abbreviated text unit are in a similar order to characters of the candidate text unit.

8. The communications server apparatus as claimed in claim 1, wherein for the step of selecting candidate text data elements with associated candidate text units having an ordered relationship with the abbreviated text unit, the apparatus is configured to:
    determine for a candidate text unit and an abbreviated text unit whether characters of the abbreviated text unit are the same or similar to consonants of the candidate text unit.

9. The communications server apparatus as claimed in claim 1, wherein the similarity measure comprises a cosine similarity measure.

10. The communications server apparatus as in claim 1, wherein the similarity measure comprises an orthographic similarity measure.

11. A communications device for processing text data for disabbreviation of text units comprising a processor and a memory, the communications device being configured, under control of the processor, to execute instructions stored in the memory to:
    receive text data comprising at least one text data element associated with an abbreviated text unit;
    compare the at least one text data element with a plurality of candidate text data elements from a representation of a given text database, each candidate text data element associated with a respective candidate text unit in the database;
    determine values for a similarity measure between the at least one text data element and the candidate text data elements;
    process candidate text data elements to select candidate text data elements with associated candidate text units having an ordered relationship with the abbreviated text unit; and
    use the similarity measure values and the candidate text data element selections to nominate an associated candidate text unit as a disabbreviated text unit for the abbreviated text unit,
    wherein the representation of the text database is a vector space model trained on the given text database, and wherein the text data elements comprise vectors from the model, each vector of the vector space model being associated with a respective candidate text unit, and wherein the device is configured to compare at least one text data element vector with a plurality of candidate text data element vectors.

12. A system for processing text data for disabbreviation of text units, comprising communications server apparatus, at least one user communications device and communications network equipment operable for the communications server apparatus and the at least one user communications device to establish communication with each other therethrough, wherein the at least one user communications device comprises a first processor and a first memory, the at least one user communications device being configured, under control of the first processor, to execute first instructions stored in the first memory to:

receive text data comprising at least one text data element associated with an abbreviated text unit, and wherein:
the communications server apparatus comprises a second processor and a second memory, the communications server apparatus being configured, under control of the second processor, to execute second instructions stored in the second memory to:
compare the at least one text data element with a plurality of candidate text data elements from a representation of a given text database, each candidate text data element associated with a respective candidate text unit in the database;
determine values for a similarity measure between the at least one text data element and the candidate text data elements;
process candidate text data elements to select candidate text data elements with associated candidate text units having an ordered relationship with the abbreviated text unit; and
use the similarity measure values and the candidate text data element selections to nominate an associated candidate text unit as a disabbreviated text unit for the abbreviated text unit,
wherein the representation of the text database is a vector space model trained on the given text database, and wherein the text data elements comprise vectors from the model, each vector of the vector space model being associated with a respective candidate text unit,
and wherein the communications server apparatus is configured to compare at least one text data element vector with a plurality of candidate text data element vectors.

13. A method, performed in a communications server apparatus for processing text data for disabbreviation of text units, the method comprising, under control of a processor of the server apparatus:

receiving text data comprising at least one text data element associated with an abbreviated text unit;
comparing the at least one text data element with a plurality of candidate text data elements from a representation of a given text database, each candidate text data element associated with a respective candidate text unit in the database;
determining values for a similarity measure between the at least one text data element and the candidate text data elements;
processing candidate text data elements to select candidate text data elements with associated candidate text units having an ordered relationship with the abbreviated text unit; and
using the similarity measure values and the candidate text data element selections to nominate an associated candidate text unit as a disabbreviated text unit for the abbreviated text unit,
wherein the representation of the text database is a vector space model trained on the given text database, and wherein the text data elements comprise vectors from the model, each vector of the vector space model being associated with a respective candidate text unit,
and wherein the method comprises comparing at least one text data element vector with a plurality of candidate text data element vectors.

14. A non-transitory storage medium storing instructions, which when executed by a processor, cause the processor to perform the method of claim 13.

* * * * *